(12) United States Patent
Kostyuchenko et al.

(10) Patent No.: US 6,776,256 B2
(45) Date of Patent: Aug. 17, 2004

(54) METHOD AND APPARATUS FOR GENERATING SEISMIC WAVES

(75) Inventors: Vladimir Nikolaevich Kostyuchenko, Moscow (RU); Gevorg Grantovich Kocharyan, Moscow (RU); Igor Stepanovich Svintsov, Moscow (RU)

(73) Assignees: Schlumberger Technology Corporation, Ridgefield, CT (US); The Institute for Dynamics of Geospheres, Russian Academy of Sciences, Moscow (RU)

( * ) Notice: Subject to any disclaimer, the term of this patent is extended or adjusted under 35 U.S.C. 154(b) by 0 days.

(21) Appl. No.: 10/124,863

(22) Filed: Apr. 18, 2002

(65) Prior Publication Data

US 2002/0185330 A1 Dec. 12, 2002

(30) Foreign Application Priority Data

Apr. 19, 2001 (RU) .......................................... 2001110597
Apr. 19, 2001 (RU) .......................................... 2001110598

(51) Int. Cl.[7] .............................. G01V 1/06; E21B 43/24
(52) U.S. Cl. ........................ 181/116; 181/117; 166/260
(58) Field of Search ................................. 181/101–122; 166/256–262, 268, 270, 270.1, 400, 270.2, 401, 299

(56) References Cited

U.S. PATENT DOCUMENTS

| | | | |
|---|---|---|---|
| 1,049,735 A | | 1/1913 | Kowastch |
| 1,627,991 A | | 5/1927 | Owen |
| 2,846,019 A | * | 8/1958 | Lang ........................... 181/106 |
| 3,064,753 A | * | 11/1962 | McClure ..................... 181/118 |
| 3,623,570 A | * | 11/1971 | Holloway ................... 181/118 |

(List continued on next page.)

FOREIGN PATENT DOCUMENTS

| | | |
|---|---|---|
| RU | 760010 | 8/1980 |
| RU | 1710709 | 2/1992 |
| RU | 1803544 | 3/1993 |
| RU | 2001254 | 10/1993 |
| RU | 2042799 | 8/1995 |
| RU | 2064576 | 7/1996 |
| RU | 2065949 | 8/1996 |
| RU | 2075596 | 3/1997 |
| RU | 2082990 | 6/1997 |

OTHER PUBLICATIONS

Nedra, M. "Seismic Exploration Manual for Geophysics". (1981), pp. 378.
Pazyrev, N. N. et al. "Seismic Exploration by Transverse and Converted Wave Method". (1985), Abstract and pp. 22.
Adushkin, V. V. et al. "On Non–linear Nature of Rock Mass Deformation Under Small Amplitude Wave Passage". DAN (1999), vol. 368, No. 1, pp. 103–107.
Kurlenya, M. V. et al. "Determination of Region of A Vibratory Seismic Stimulation of Oil Pool from Daylight Surface". FTPRPI, (1999), No. 4, pp. 1–31.

Primary Examiner—Rina Duda
Assistant Examiner—Patrick Miller
(74) Attorney, Agent, or Firm—William L. Wang; William B. Batzer; John J. Ryberg

(57) ABSTRACT

A method of generating seismic waves in a rock mass surrounding a well comprises the steps of:

(a) providing a packer and a fluid withdrawal line within the well, wherein the packer is located below the weathering zone and defines the upper limit of a working volume within the well, and the fluid withdrawal line is adapted to withdraw fluid from the working volume; and (b) providing and detonating an air-fuel mixture in the working volume to generate seismic waves, combustion products of the detonation being withdrawn from the working volume via the fluid withdrawal line.

22 Claims, 3 Drawing Sheets

U.S. PATENT DOCUMENTS

| | | | |
|---|---|---|---|
| 3,687,229 A | | 8/1972 | Carruth |
| 3,702,635 A | | 11/1972 | Farr |
| 3,752,256 A | * | 8/1973 | Mollere ................ 181/117 |
| 3,905,553 A | * | 9/1975 | Bradley et al. ........ 239/124 |
| 4,026,382 A | | 5/1977 | Field et al. ............ 181/117 |
| 4,108,271 A | * | 8/1978 | Chelminski ........... 181/119 |
| 4,148,375 A | | 4/1979 | Dowler et al. |
| 4,945,984 A | * | 8/1990 | Price ..................... 166/63 |
| 5,864,517 A | * | 1/1999 | Hinkey et al. ........ 367/145 |
| 6,408,614 B1 | * | 6/2002 | Eizenhofer ............ 60/200.1 |
| 6,491,098 B1 | * | 12/2002 | Dallas ................... 166/297 |

* cited by examiner

METHOD AND APPARATUS FOR GENERATING SEISMIC WAVES

FIELD OF THE INVENTION

The present invention relates to a method and apparatus for generating seismic waves, and in particular a method and apparatus for generating seismic waves to improve reservoir performance and well output.

BACKGROUND OF THE INVENTION

The use of vibratory seismic wave sources of various types for stimulating oil reservoirs is known.

For example, explosion-type sources positioned within a well can be used to stimulate a reservoir. The sources may comprise charges, such as tanks containing liquid or gas fuel materials and priming cartridges with powder and solid explosives. Another known method involves preparing an explosive mixture directly in a well by water electrolysis [1–5].

However, problems associated with such methods include: the low power of the sources; the inconvenience of lifting an apparatus to the surface to equip it for subsequent stimulations; and the risk of accidental explosion of components of the apparatus. The risk of damaging the well prevents the user from increasing the amplitude of the vibratory stimulation by applying more powerful solid or liquid blasting substances.

Mechanical stimulation of reservoirs [6,7] involving periodically applied impacts against the well bottom may also be used to improve oil production. These methods, however, suffer the following disadvantages:

1. They are technically complex because the stimulation is effected by the impact of a long string (about 1 km) placed inside a well; and
2. As the time of impact is quite long (about 1 s), the rock is only locally affected. Furthermore the longitudinal waves transmitted into the rock mass have a very small stress amplitude.

Therefore, in general, known methods of vibratory stimulation of oil reservoirs using sources positioned within a well suffer from a restricted stimulation area and are efficient only at the bottomhole zone of the reservoir due to the small stimulation amplitude.

An alternative method of wave stimulation of a deposit is taught in [8]. The method is based on the stimulation of a rock mass by a powerful vibrator which rests on the surface and has a vibration frequency matching the frequency of characteristic vibrations of the producing formation. In contrast to the abovementioned methods, the stimulation area of this method is not restricted to the bottomhole zone of the formation and may cover a considerable area of the deposit.

However, this alternative method suffers from a low efficiency due to high attenuation as the waves progress from the surface, especially through the weathering zone (i.e the surface geological layer which is affected by atmospheric weathering). For this reason, to accumulate significant residual strains (which increase formation permeability and thereby improve reservoir performance) in a reservoir bed, a large number of stimulations must be performed.

In the separate field of seismic exploration, known apparatuses for generating seismic waves comprise gas mixture preparation units and operate by the explosive energy of such mixtures.

Seismic sources comprising an explosion chamber located on the surface tend to be inefficient because the waves attenuate as they dissipate from the surface, especially through the weathering zone [9].

One known seismic wave generation apparatus employed in seismic exploration comprises [10] a pipe, open at its lower end, which is adapted to be driven into the top layers of soft earth. Oxygen and acetylene are supplied by a valve system, mixed in a predetermined ratio, and introduced into the inside of the pipe to fill the pipe and voids in the earth in the vicinity of the pipe lower end. The gas mixture is ignited at the top end of the pipe and the detonation wave progresses down the pipe to detonate the gas filling the voids near the lower section of the pipe. After several successive explosions a void space of a constant volume is formed in the earth. Seismic waves are transmitted into the earth as the result of detonating the mixture. The process is repeated after a predetermined time interval.

However, this apparatus suffers the following problems:

1. Its efficiency is low due to attenuation as the waves progress through the weathering zone;
2. It cannot be employed in hard rock;
3. The use of oxygen and acetylene leads to a high risk of accidental explosion;
4. Local conditions affect the stability of the source; and
5. The transmitted transverse waves are of low intensity.

SUMMARY OF THE INVENTION

Thus it is an object of the present invention to improve hydrocarbon (e.g. oil or gas) recovery from reservoirs and well output. A further object of the present invention to improve the efficiency of transmission of transverse waves from a seismic source in dense rock, and to enable repetitive transmission of waves at predetermined time intervals.

In a first aspect the present invention provides a method of generating seismic waves in a rock mass surrounding a well, the method comprising the steps of: (a) providing a packer and a fluid withdrawal line within the well, wherein the packer is located below the weathering zone and defines the upper limit of a working volume within the well, and the fluid withdrawal line is adapted to withdraw fluid from the working volume; and (b) providing and detonating an air-fuel mixture in the working volume to generate seismic waves, combustion products of the detonation being withdrawn from the working volume via the fluid withdrawal line.

The fuel of the air-fuel mixture is typically a hydrocarbon, for example a hydrocarbon gas such as propane or methane. Conveniently, the air of the air-fuel mixture is the surrounding, oxygen-nitrogen atmosphere. However, the air may be any, typically oxygen-based, naturally-occurring or artificial gas or gas mixture which can react with the fuel in an explosive manner.

The method can be used to stimulate hydrocarbon production from a hydrocarbon well. As the air-fuel mixture is deployed downhole, the risk of an accidental surface explosion can be reduced. Furthermore, by evacuating the combustion products from the working volume, the method can be repeated at relatively short time intervals. Indeed, in a preferred embodiment, step (b) is performed repeatedly.

Thus the present invention can enable long-term stimulation of hydrocarbon reservoirs by high-intensity transverse waves caused by repetitive detonations of a gaseous air-fuel mixture within a well working volume of predetermined length located in dense rock below the weathering zone.

A further advantage of the method is that the force of the detonation can easily be controlled in response to below the weathering zone, the seismic waves are still relatively strong when they reach the target formation.

Preferably, the method further comprising the step of filling the working volume with air before step (b). In this way any liquid (e.g. water, mud etc.) in the working volume can be evacuated before the air-fuel mixture is provided.

In one embodiment, step (a) further comprises providing a detonation transmission line which terminates at one end in the working volume, and step (b) further comprises causing a priming detonation at the other end of the transmission line to detonate the air-fuel mixture in the working volume. This allows the working volume detonation to be controlled remotely, typically from the surface. An electric spark discharge may be used to initiate the priming detonation.

Preferably, the detonation transmission line expands out in a cone-shape at its terminus in the working volume. The diameter of the detonation transmission line is typically significantly smaller than that of the working volume, but the cone-shape encourages the detonation wave which travels along the detonation transmission line to propagate smoothly into the working volume.

Conveniently, the air for the air-fuel mixture may be supplied to the working volume via the detonation transmission line, thereby avoiding the need to provide a separate air supply line.

Preferably the fuel for the air-fuel mixture is supplied to the working volume by a separate fuel supply line. By keeping the fuel and air separate until they are mixed in the working volume, the risk of accidental explosions is further reduced.

The fuel may be supplied to the working volume at spaced positions along the working volume, thereby improving the mixing of the fuel and air in the working volume.

In a further aspect, the present invention provides a method for generating seismic waves in a rock mass surrounding a well, comprising the steps of: (a) installing a packer and a drain pipe within the well, and supplying air and fuel inside the well, said packer being located below the weathering zone; (b) filling a working volume of the well with air, said working volume being a well region between the packer and a lower end of the drain pipe; and (c) repetitively detonating an air-fuel mixture within said working volume.

The method may be used to effect wave stimulation of an oil reservoir.

Preferably, the method further comprises supplying air into the working volume through a detonation transmission line.

Preferably the volume of fuel supplied into the working volume equals the sum of the volumes of the detonation transmission line and the working volume of the well.

In a further aspect, the present invention provides a method of stimulating an oil reservoir of a well, the method including repetitively generating high-intensity transverse seismic waves transmitted as the result of the detonation of a gas air-fuel mixture within a working volume of the well, the working volume being defined by the distance from a packer to the lower end of a drain pipe and being located in dense rock below the weathering zone.

Optional features of the method of any one of the previous aspects may be applied to the method of any other of the previous aspects.

In a further aspect, the present invention provides an apparatus for generating seismic waves in a rock mass surrounding a well, the apparatus comprising: (a) a packer which is locatable in the well below the weathering zone to define the upper limit of a working volume within the well; (b) a fuel line which is locatable in the well to supply the fuel for an air-fuel mixture in the working volume; (c) a detonation transmission line which is locatable in the well to terminate at one end in the working volume whereby a priming detonation at the other end of the line causes the air-fuel mixture in the working volume to detonate; and (d) a fluid withdrawal line which is locatable in the well to withdraw fluid from the working volume, whereby combustion products of the detonation of the air-fuel mixture are withdrawable via the fluid withdrawal line.

Thus the apparatus can be used to detonate an air-gas mixture within a region of well drilled into dense rock and below the weathering zone, whereby high-frequency pulses of substantial amplitude can be transmitted throughout the rock mass.

The detonation transmission line may be adapted to supply the air for the air-fuel mixture in the working volume. Furthermore, the detonation transmission line may expand out in a cone-shape at its terminus in the working volume. Preferably, the detonation transmission line comprises a priming unit for causing the priming detonation, and more preferably the priming unit is an electric spark discharge generator.

Preferably, the packer is adapted to allow the fuel line, the detonation transmission line and the fluid withdrawal line to pass through the packer to the working volume.

The fuel line may have spaced perforations to supply the fuel at spaced positions along the working volume. Preferably, the perforations are uniformly spaced.

In one embodiment, the apparatus further comprises a fuel reservoir which is connectable to the fluid line whereby the fluid line supplies fuel to the working volume from the reservoir, the amount of fuel holdable by the reservoir being variable so that a stochiometric air-fuel mixture is providable in the working volume.

In a further aspect, the present invention provides an apparatus of the previous aspect which is installed in a well. Preferably, the well is a hydrocarbon well.

In a further aspect, the present invention provides an apparatus having: a packer, a drain pipe, a detonation transmission line and a fuel line, said drain pipe, detonation transmission line and fuel line passing inside the well, wherein said packer is located below a weathering zone, said detonation transmission line is adapted to fill a working volume of the well with air, and the working volume is a well region between the packer and the lower end of the drain pipe.

The fuel line may comprise a fuel receiver or reservoir having a variable volume. Preferably the volume of the fuel receiver or reservoir equals the sum of the volumes of the detonation transmission line and the working volume.

In a further aspect, the present invention provides an apparatus comprising a packer with a drain pipe and a valve, a detonation transmission line to transmit detonation into a well working volume, and a filling system (comprising e.g. a control panel) for filling the working volume with a gas mixture, the working volume being bounded by the packer above and by (e.g. a lower end of) the drain pipe below. Preferably the working volume from through the detonation progresses is a well region located in dense rock below the weathering zone and bounded by the packer and the lower end of the drain pipe.

Optional features of the apparatus of any one of the previous aspects may be applied to the apparatus of any other of the previous aspects.

BRIEF DESCRIPTION OF THE DRAWINGS

A better understanding of the principles and details of the present invention will be evident from the following description taken in conjunction with the accompanying drawings, in which.

DETAILED DESCRIPTION

Practical Embodiment

Figure 1:
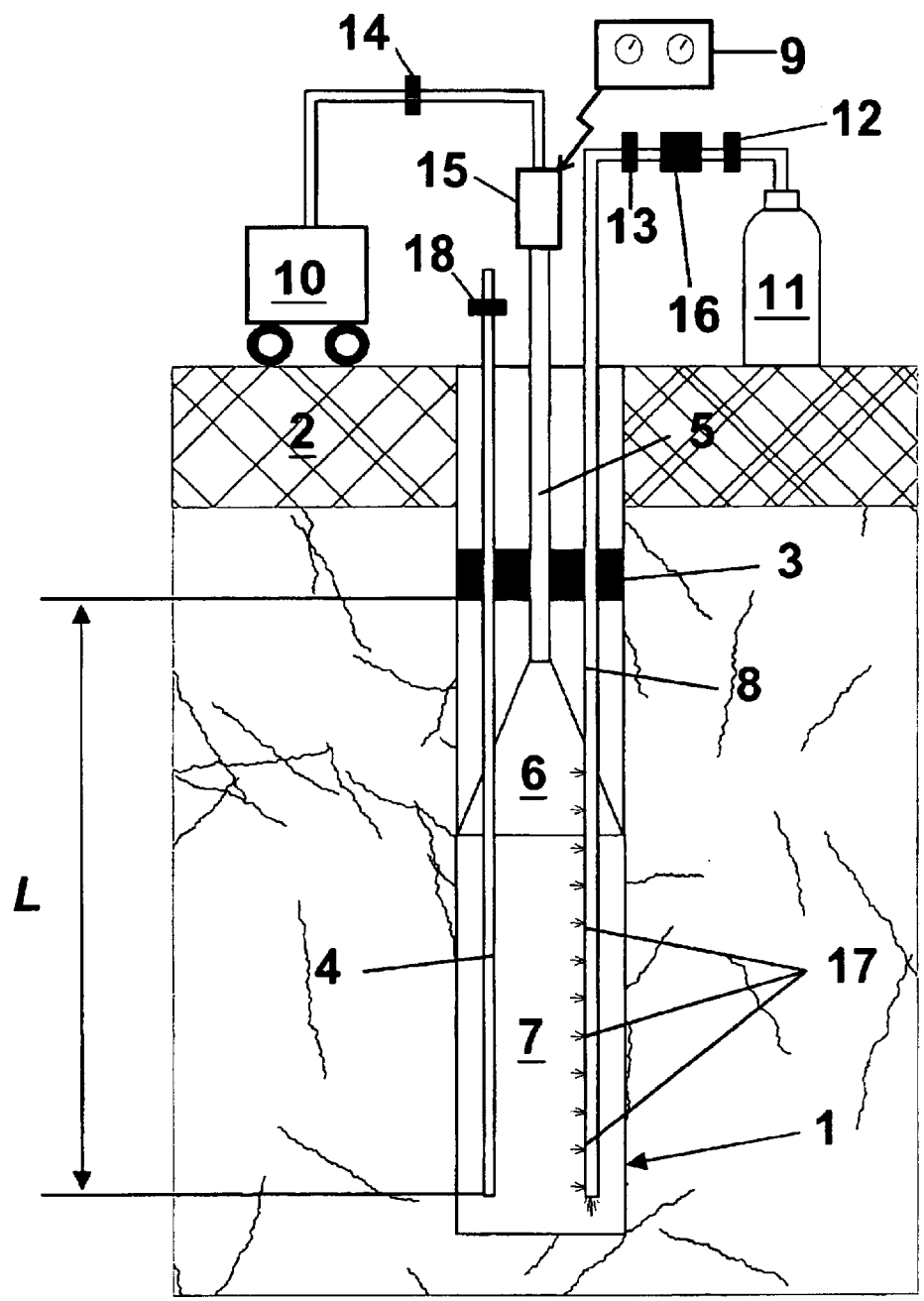
FIG. 1 shows a schematic diagram of an apparatus in accordance with the invention.

FIG. 1 shows schematically an apparatus for generating seismic waves in the rock mass surrounding a well 1, and thereby stimulating hydrocarbon production from the well. The well is drilled into dense rock. The apparatus comprises a packer 3 below the weathering zone 2. The packer defines the upper limit of a working volume 7 of the well, the working volume being of length L. The apparatus further comprises a fluid withdrawal line in the form of a drainage/exhaust pipe 4, a detonation transmission line 5 to transfer detonation to the working volume, and a fuel supply line 8. These lines pass from the surface, through the packer, and into the working volume. The lower end of the drainage pipe defines the lower limit of the working volume, and the detonation transmission line 5 terminates in the working volume with a cone 6.

The apparatus also includes an air and fuel supply system which supplies air from a compressor 10 through valve 14 to the detonation transmission line and fuel from a flask 11 through valves 12 and 13 to the fuel supply line. A priming chamber 15 is provided at the surface end of the detonation transmission line; a variable volume fuel receiver (i.e. fuel reservoir) 16 is provided between valves 12 and 13 at the surface end of the fuel supply line; and an output valve 18 is provided at the surface end of the drainage pipe. A control panel 9 controls the priming chamber and provides signals for the automatic opening and closing of the valves.

The apparatus operates in the following manner. Output valve 18 is opened and the working volume is filled with air, under a predetermined pressure, through the detonation transmission line 5 via valve 14 from the compressor 10. The predetermined pressure value exceeds the hydrostatic liquid pressure at the depth of the working volume. In this way, liquid is forced out of the working volume through the drainage/exhaust pipe 4 and is replaced by air. Output valve 18 is then closed.

A predetermined amount of propane is introduced into the fuel receiver 16 through valve 12 while valve 13 is closed. The receiver volume corresponds to the sum of the volumes of the working volume and the detonation transmission line such that a stoichiometric mixture of air and propane is formed in the working volume. After closing valves 12 and 14, the predetermined amount of propane is injected into the working volume 7 via valve 13 (which is now open) through the fuel line 8. To enhance the mixing of the propane with the air, the fuel line may have perforations 17 uniformly spaced over the working volume. Next, valve 13 is closed and the air-propane mixture in the priming chamber 15 is ignited by the control panel 9. The combustion front propagates along line 5 and forms a detonation wave which enters the working volume at cone 6 to detonate the mixture in the working volume 7. The shape of the cone makes it possible to detonate air-hydrocarbon (e.g. propane, methane) mixtures in the working volume. The cone encourages the detonation wave to progress smoothly from the relatively small diameter of line 5 to the larger diameter of the working volume. If there were an abrupt change in diameter at this point, the detonation wave could be reflected by the change of diameter.

As the detonation wave progresses along the working volume, substantially transverse waves are transmitted into the surrounding rock mass. When the detonation terminates, the working volume is blown through by air with output valve 18 open, whereupon the detonation combustion products are flushed from the working volume via the drainage/exhaust pipe 4, and the cycle is then repeated. A minimum duration for the complete cycle of about 10 seconds is achievable. The detonation frequency may be controlled over a wide range from the control panel 9. An integrated quartz oscillator provides high synchronization for an ignition control signal (with variation of no more than 1 ms).

As the well is drilled into dense rock, the walls of the well are not damaged by the gas mixture detonation, and thus the repeatedly transmitted seismic wave signals are highly coherent. Therefore, "stacking" (i.e. signal accumulation) can be used to improve the signal to noise ratio if the wave signals are to be used for performing a seismic survey in addition to, or separately from, stimulating the well.

The amplitude and frequency characteristics of the seismic source can be adjusted by varying the length of the working region and the initial pressure of the mixture.

The apparatus is safe to operate since the fuel is mixed with air directly in the working volume of the well.

Theoretical Considerations

The detonation wave pressure PD is provided by the formula $P_D = KP$, where P is the pressure of fluid filling the well at the working volume depth, and K is a coefficient which is about 20 for the most air-fuel mixtures.

The time T of pressure build-up within the working volume is related to the length L of the well working volume and the detonation velocity D by the relation $T = L/D$.

The detonation velocity D is a function of the specific heat of reaction q and the ratio of specific heats of the products γ according to the relation:

$$D = \sqrt{2(\gamma^2 - 1)q} \approx \sqrt{q}.$$

According to estimates made for air-fuel mixtures, a reasonable value for $q = 1$ Kcal/g $= 4*10^6$ m$^2$/s$^2$, whence it follows that $D = 2$ km/s, and thus at $L = 10$ m, $T = 5$ ms.

The value of 1/T defines the upper frequency of the transmitted seismic waves caused by the explosion of the air-fuel mixture (the lower frequency is defined by the pressure decay time τ, which is the time it takes for the combustion products to move up the drainage/exhaust pipe). Thus the wave spectrum lies approximately in the range from 10 to 100 Hz.

Therefore, an air-fuel explosive source can have a wide frequency range to provide efficient stimulation of reservoir beds of different thickness.

The trinitrotoluol equivalent $E_t$ of the air-fuel mixture in the working volume is defined as $E_t = qM/q_t$, where M is the mass of air-fuel mixture enclosed within a working volume of the well having cross-section area S and length L, and $q_t$ is the specific heat of the air-fuel mixture. Thus detonation of an air-fuel mixture in a working volume of length L=10 m and cross-section area $S=0.03$ m$^2$ located at a depth of 100 m (for which $P=1$ MPa) provides an $E_t=3$ kg.

For comparison, the table below provides the performances of some non-explosive sources used in seismic exploration [11]

| Source type | Trinitrotuluol equivalent |
|---|---|
| Pulse source: | |
| GSK-10 | 20–35 g |
| SI-32 | 12 g |
| Vibratory/pulse source: | |
| GUK-1 | 10 g |
| GUK-2 | 18 g |
| Vibratory source SV-5-150 | 20 g |

As seen from the table, pulse and vibratory sources are lower by about two orders of magnitude in $E_t$ than an explosive source according to the present invention.

Figure 2:
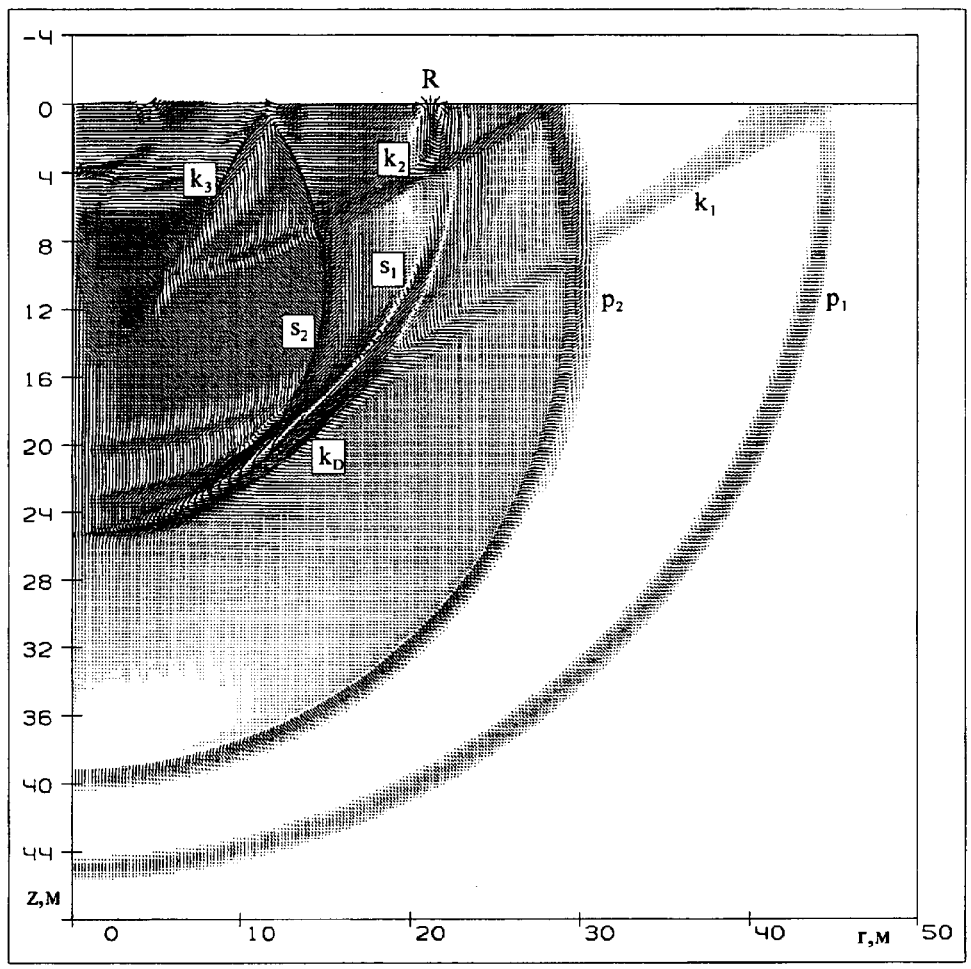
FIG. 2 shows the results of computational modelling of air-fuel mixture explosion in a dense limestone-type rock mass.

The results of computational modelling of air-fuel mixture explosion in a dense limestone-type rock mass (for which the propagation velocity of longitudinal waves $C_p=3000$ m/s, the propagation velocity of transverse waves $C_s=1540$ m/s, and rock density $\rho=2700$ kg/m$^3$) are shown in FIG. 2 (with z being distance along the well axis and r being radial distance from the well). The modelling was performed for a mixture detonated in a well region 10 m long (from 0 to 10 m) and 200 mm in diameter. The detonation velocity $D_f=2000$ m/s. The drawing shows the vector field (with the length proportional to the logarithm of amplitude of earth displacement velocity vector) at time $t=15$ ms.

FIG. 2 clearly shows longitudinal wave (p1) and transverse wave (s1) both propagating from explosion point (z=0). As the result of impact of the detonation wave against the end face of the well, longitudinal wave (p$_2$) and transverse wave (s$_2$) are generated. The detonation wave travelling along the well is an intense source of transverse waves having a front envelope of conical shape because $D_f>C_s$. The maximum vibration amplitude is just located in the transverse wave group, which can be seen in FIG. 2 (the darkest area in the vector diagram). Analysis of the computation results shows that such a pattern is inherent in the transseismic mode of detonation wave propagation along a well ($C_s<D_F<C_p$).

The maximum amplitude of the rock displacement velocity produced by the explosive source has been numerically computed as $V_m \sim 5*10^{-3}$ cm/s.

On the other hand, the maximum amplitude $V_{mv}$ of a seismic wave transmitted by a vibrator resting on a rock mass surface may be estimated using the relation [12]:

$$V_{mv} = \frac{F_m \cdot f}{\rho V_p^2 \cdot R} A(v).$$

Here, $F_m$ is the maximum force of the vibrator, R is the distance from the measuring point; $\rho$ is the rock density, $V_p$ is the transverse wave velocity; f is the vibrator frequency; and $A(v)$ is the dependence of transverse wave amplitude on angle $v$ (at $v=0$, $A(v)=1$).

Thus for typical values of $F_m=10,000$ kgf, $\rho=3*10^3$ kg/m$^3$, $V_p=4000$ m/s, and $f=30$ Hz, the amplitude of seismic wave transmitted by the vibrator at distance $R=100$ m will be $V_{mv} \approx 5*10^{-5}$ cm/s, which is two orders of magnitude less than the corresponding value in the method in accordance with the present invention.

The maximum detonation pressure of the air-fuel mixture in the above example is $P_D=200$ kgf/cm$^2$, which would enable repetitive stimulation of the deposit while preserving the integrity of the well.

Figure 3:
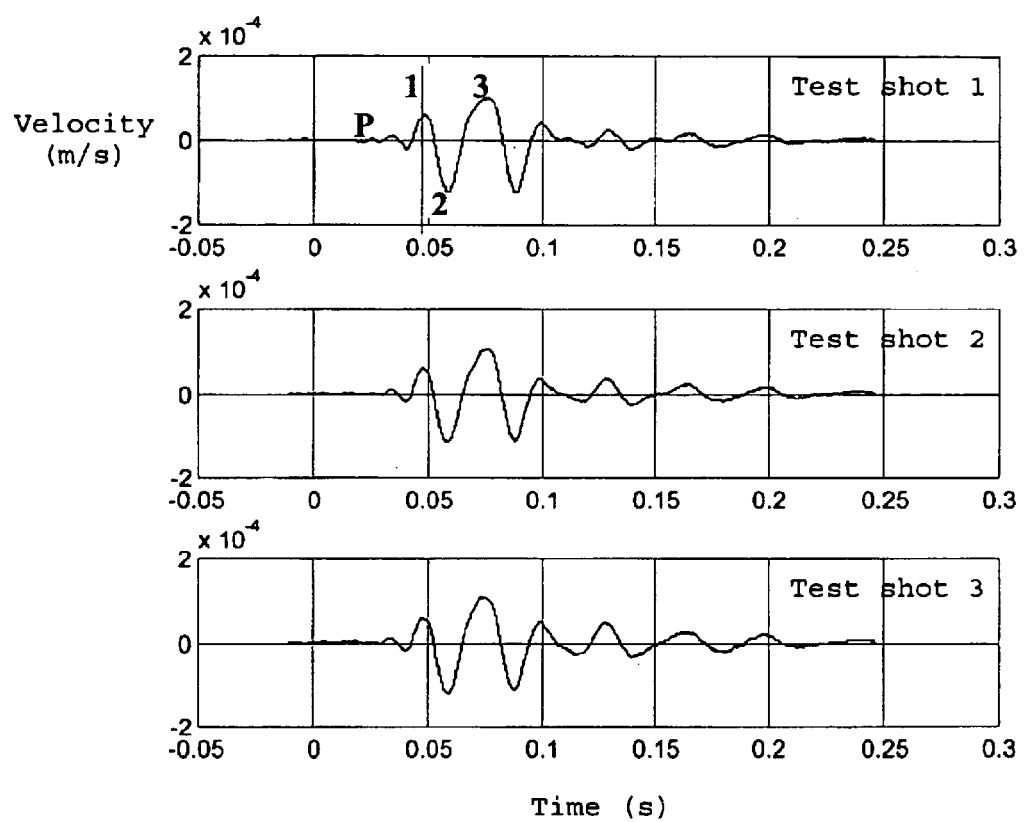
FIG. 3 shows typical seismic records of the vertical mass velocity.

We refer now to FIG. 3, which shows seismic records of the vertical velocity measured on the surface of a highly fractured granite mass at a distance of 105 m from a well of about 10 m depth. The records were obtained from three test shots of an air-fuel mixture, each test being performed at a different time. The working volume of the well extended for about 7 m along the well. The first onset marked as "P" in the seismic records corresponds to the arrival of a forward-travelling longitudinal wave at the measuring position. The propagation velocity of the three main phases marked by numerals 1, 2, 3 in the records is close to the transverse wave velocity. The amplitude of the transverse wave considerably exceeds that of the longitudinal wave, which corresponds to the transmission characteristics of a well source formed by an explosive air-fuel mixture as discussed above in relation to FIG. 2.

Comparison of the seismic records shows satisfactory repeatability of the signals.

The characteristics of the transmitted spatial modes (e.g. amplitude, duration, spectral content) can be varied by changing the source characteristics (length of well used to form the working volume, working volume depth relative to the surface etc.).

Under repetitive stimulations residual strains accumulate in fractured reservoirs and this may lead to increased filtration properties of the bed. As described in the literature [13], residual strains appear in fractured rock at very small amplitudes of spatial modes. The existing experimental data shows, however, a substantial dependence of the efficiency of formation vibratory stimulation on the vibration amplitude (particularly its horizontal component) in the reservoir location region [14]. The present invention provides a way of controlling this vibration amplitude.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

REFERENCES

All the references mentioned below and in the above text are hereby incorporated by reference.

1. RU patent No.2065949, E21B 43/263, 1992.
2. SU Inventor's Certificate No.1803544, E21B 43/25, 43/248, 1991.
3. RU patent No.2042799, E21B 43/25, 1992.
4. RU patent No.2064576, E21B 43/263, 1996.
5. RU patent No.2082990, G01V 1/04, 1997.
6. RU patent No.1710709, E21B 43/25, 1992.
7. RU patent No.2075596, E21B 43/25, 28/00, 43/16, 1995.
8. RU patent No.2001254, E21B 43/25,1990
9. SU Inventor's Certificate No. 760010 G 01 V 1/04, 1980
10. U.S. Pat. No. 4,026,382, G01V 1/12, G01 V 1/4.
11. Seismic Exploration, Reference Manual for Geophysics, M. Nedra, 1981.
12. Puzyrev N. N., Trigubov A. V., Brodov L. U. et al., Seismic Exploration by Transverse and Converted Wave Method, M. Nedra, 1985. 277 pages.

13. Adushkin V. V., Kostyuchenko V. N., Kocharyan G. G., Pavlov D. V., On Non-linear Nature of Rock Mass Deformation under Small Amplitude Wave Passage, DAN, 1999, v.368, No.1, pages 103–107.

14. Kurlenya M. V., Serdyukov S. V., Determination of Region of Vibratory Seismic Stimulation of Oil Pool from Daylight Surface, FTPRPI, 1999, No.4, pages 1–31.

What is claimed is:

1. A method of generating seismic waves in a rock mass surrounding a well, the method comprising the steps of:
    (a) providing a packer, a fluid withdrawal line, and a detonation transmission line, wherein the packer is located below a weathering zone and defines an upper limit of a working volume within the well, the fluid withdrawal line is adapted to withdraw fluid from the working volume, and the detonation transmission line terminates at one end in the working volume; and
    (b) providing an air-fuel mixture in the working volume, and causing a priming detonation at a second end of the transmission line to detonate the air-fuel mixture in the working volume and thereby generate seismic waves, combustion products of the detonation of the air-fuel mixture being withdrawn from the working volume via the fluid withdrawal line.

2. A method of generating seismic waves according to claim 1, wherein step (b) is performed repeatedly.

3. A method of generating seismic waves according to claim 1, further comprising the step of filling the working volume with air before step (b).

4. A method of generating seismic waves according to claim 1, wherein the detonation transmission line expands out in a cone-shape at its terminus in the working volume.

5. A method of generating seismic waves according to claim 1, wherein an electric spark discharge initiates the priming detonation.

6. A method of generating seismic waves according to claim 1, wherein the air for the air-fuel mixture is supplied to the working volume via the detonation transmission line.

7. A method of generating seismic waves according to claim 1, wherein the fuel for the air-fuel mixture is supplied to the working volume at spaced positions along the working volume.

8. A method of generating seismic waves according to claim 1, wherein the well is a hydrocarbon well.

9. A method of generating seismic waves according to claim 8, wherein the seismic waves are for stimulating hydrocarbon production from the well.

10. An apparatus for generating seismic waves in a rock mass surrounding a well, the apparatus comprising:
    a packer which is locatable in the well below a weathering zone to define an upper limit of a working volume within the well;
    a fuel line which is locatable in the well to supply fuel for an air-fuel mixture in the working volume;
    a detonation transmission line which is locatable in the well to terminate at one end in the working volume whereby a priming detonation at a second end of the detonation transmission line causes the air-fuel mixture in the working volume to detonate; and
    a fluid withdrawal line which is locatable in the well to withdraw fluid from the working volume, whereby combustion products of the detonation of the air-fuel mixture are withdrawable via the fluid withdrawal line.

11. An apparatus for generating seismic waves according to claim 10, wherein the detonation transmission line is adapted to supply the air for the air-fuel mixture in the working volume.

12. An apparatus for generating seismic waves according to claim 10, wherein the packer is adapted to allow the fuel line, the detonation transmission line and the fluid withdrawal line to pass through the packer to the working volume.

13. An apparatus for generating seismic waves according to claim 10, wherein the detonation transmission line expands out in a cone-shape at its terminus in the working volume.

14. An apparatus for generating seismic waves according to claim 10, wherein the fuel line has spaced perforations to supply the fuel at spaced positions along the working volume.

15. An apparatus for generating seismic waves according to claim 14, wherein the perforations are uniformly spaced.

16. An apparatus for generating seismic waves according to claim 10, wherein the detonation transmission line comprises a priming unit for causing the priming detonation.

17. An apparatus for generating seismic waves according to claim 16, wherein the priming unit is an electric spark discharge generator.

18. An apparatus for generating seismic waves according to claim 10, further comprising a fuel reservoir which is connectable to the fuel line whereby the fuel line supplies fuel to the working volume from the reservoir, the amount of fuel holdable by the reservoir being variable so that a stochiometric air-fuel mixture is providable in the working volume.

19. An apparatus for generating seismic waves according to claim 10 which is installed in the well.

20. An apparatus for generating seismic waves according to claim 19, wherein the well is a hydrocarbon well.

21. Use of the apparatus of claim 10, for stimulating hydrocarbon production from the well.

22. Use of the apparatus of claim 10, for performing a seismic survey in the well.

* * * * *